Feb. 7, 1939.  J. W. LEIGHTON  2,146,545
HYDRAULIC BRAKE CYLINDER
Filed Feb. 13, 1936
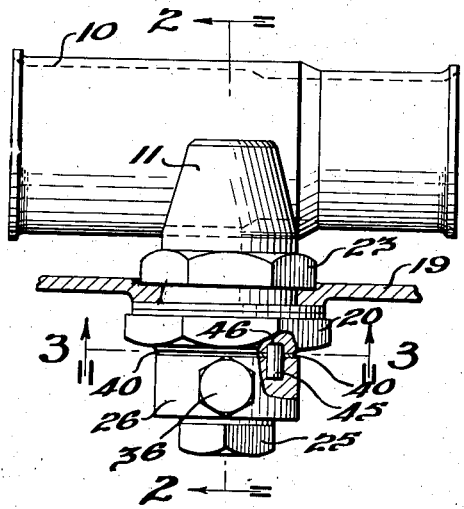
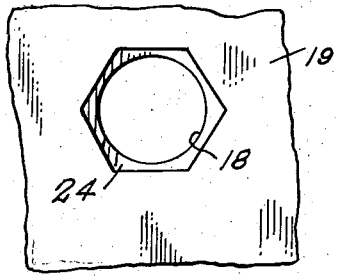
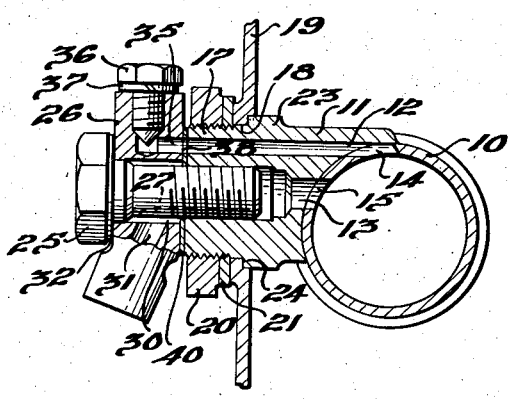
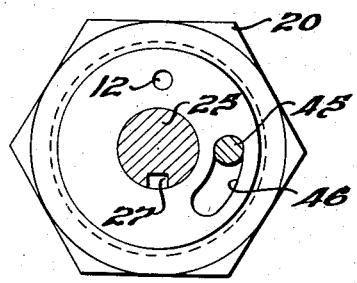
INVENTOR
John W. Leighton.
BY
Harness, Dickey, Pierce & Hann
ATTORNEYS.

Patented Feb. 7, 1939

2,146,545

UNITED STATES PATENT OFFICE 2,146,545

HYDRAULIC BRAKE CYLINDER

John W. Leighton, Port Huron, Mich.,

Application February 13, 1936, Serial No. 63,728

5 Claims. (Cl. 60—54.6)

This invention relates to hydraulic brake cylinder assemblies. More particularly it relates to a hydraulic brake cylinder assembly, which is exceedingly simple in construction, easy of manufacture, and rugged in form.

It is a general object of the present invention to provide a hydraulic brake cylinder assembly, which includes novel means for mounting the cylinder construction on the brake housing structure with which it is associated, the mounting means including interfitting parts between the members, serving to preclude relative rotation therebetween.

Another object of the present invention consists in novel means for bleeding the cylinder to remove air from the system at the time the assembly is installed, and further, of novel and particularly effective means for sealing the bleed port after the bleeding operation has been completed.

Many other and further objects and advantages of the present invention will become apparent from the following specification when considered in connection with the accompanying drawing forming a part thereof.

In the drawing:

Fig. 1 is a plan view of the improved brake cylinder assembly, illustrating the same mounted upon a brake housing structure.

Fig. 2 is a transverse sectional view taken substantially on the line 2—2 of Fig. 1, illustrating the construction and arrangement of ports communicating with the cylinder.

Fig. 3 is a sectional view taken substantially on the line 3—3 of Fig. 1, illustrating the mounting of the washer for sealing the bleed port.

Fig. 4 is an elevational view of a portion of the brake housing in which the device is adapted to be mounted disclosing the polygonal configuration of the shouldered recess in which the supply fitting is adapted to fit.

With more particular reference to the drawing, the particular specific embodiment of the invention illustrated therein comprises a cylinder 10 which, as is conventional in structures of this kind, has one portion thereof of slightly larger diameter than the other. This cylinder is preferably formed from a single integral piece of metal by an extrusion process and is adapted to receive a pair of oppositely disposed pistons which are connected to the opposite ends of the brake shoe which it serves to operate.

The cylinder is supported by a casting 11, which has one end thereof ground to provide a cylindrical surface complemental to the surface of the cylinder 10 to which it is preferably secured by copper welding. The casting 11 is provided with a bleed duct 12 and a fluid supply duct 13, which communicate through apertures 14 and 15, respectively, with the interior of the cylinder 10. It will be seen by reference to Fig. 2 that the bleed duct 12 lies substantially tangential to the cylinder 10 and consequently the opening 14 into the cylinder will lie at the top thereof, in order to effectively bleed air therefrom.

The casting 11 is provided with a substantially cylindrical portion 17, which is adapted to extend through a complemental circular aperture 18 in a brake housing structure 19, on which the cylinder assembly is mounted. The cylindrical extension 17 is preferably externally threaded to receive a screw collar 20 which, together with a washer 21, serves to mount the entire brake cylinder assembly upon the brake housing structure. The body portion of the casting 11 is provided with a polygonal shoulder 23, which is adapted to fit into a complemental polygonal recess 24 formed in the brake housing structure. It will therefore be apparent that as the collar 20 is screwed on to the cylindrical extension 17 of the casting 11, the polygonal shoulder 23 will be firmly seated in the complemental recess 24 and consequently prevent relative rotation between the brake cylinder assembly and the brake housing structure on which it is mounted.

The fluid supply port 13 is preferably internally threaded to receive a bolt 25, which serves to secure a substantially cylindrical fluid supply fitting 26 in position upon the axial face of the casting 11. By reference to Figs. 2 and 3, it will be seen that the bolt 25 is provided with an axially extending groove or channel 27, which will permit of communication through the fluid supply port 13, when the bolt 25 is threadably mounted therein.

The fluid supply fitting 26 is provided with a suitable aperture therethrough adapted to permit the passage of the bolt 25, and it will be seen that this aperture is of somewhat larger diameter than the shank of the bolt, in order to provide an annular space 30 around the shank of the bolt. A fluid supply duct 31 communicates with this annular space 30 and it will be clear, by reference to Fig. 2, that fluid introduced through the duct 31 may fill the annular space around the shank of the bolt and pass through the axial slot 27 of the bolt and fluid supply port 13 into the interior of the cylinder 10. A suitable washer 32 is preferably disposed between the head of the bolt 25 and the fluid supply fitting 26, in order to effect a tight seal therebetween.

The fluid supply fitting 26 is provided with a port 35, which is adapted to register with the outer end of the bleed duct 12. This bleed port 35 is adapted normally to be closed by means of a valve plug 36, threadably secured therein and locked in position by means of a conventional lock washer 37.

A packing washer, formed of copper or other suitable material, 40 is preferably disposed between the fluid supply fitting 36 and the face of the casting 11 to effect a tight seal therebetween. The washer 40 has an aperture 38 therein, which is adapted to register with the bleed port 35 and which, by means explained below, may be brought into registry with the bleed duct 12.

A short dowel pin 45 is preferably permanently secured in the axial face of the fluid supply fitting 26 and this dowel pin extends into an arcuately disposed slot 46 formed in the adjacent face of the casting 11. This dowel pin passes through a suitable circular aperture in the washer 40 and it will be seen that the pin 45 and slot 46 serve to control relative rotational movement between the fluid supply fitting and the casting 11 and to limit this movement within definitely predetermined limits. It will further be apparent that inasmuch as the dowel pin 45 passes through an aperture in the washer 40 that the washer 40 will be bodily moved as a unit with the fluid supply fitting, consequently maintaining the aperture 38 of the washer in constant registry with the bleed port 35 in the fluid supply fitting. The slot and pin 45 and 46 are preferably so positioned that when in one extreme of movement the fluid supply fitting will bring the bleed port 35 and aperture in the associated washer 40 into registry with the bleed duct 12, and when in the opposite extreme of movement will serve effectively to seal the bleed duct 12.

From the construction described above, it will be apparent that when it is desired to install the improved hydraulic brake cylinder assembly, the fitting 11 may be bolted into the brake housing by means of the screw collar 20 and due to the interfitting engagement of the shoulder 23 with its complemental recess 24, these parts will be permanently and securely locked in position. The fluid supply fitting 26 may then be mounted upon the casting 11 and bolted in position by means of the bolt 25. The fluid supply fitting 26 is rotated about the bolt 25 until a bleed port 35 and bleed duct 12 are brought into registry, and it will be apparent that when in this position these two ducts will communicate with each other through the aperture 38 in the washer 40. Fluid may then be introduced through the intake duct 31, and it will be seen that this fluid will fill the annular space around the shank of the bolt 25 and pass through the axially extending channel 27 and fluid supply duct 13 into the interior of the cylinder 10. The bleed valve plug 36 may be removed and a suitable conduit, not shown, connected to the bleed port 35, which will serve to carry off the air from the interior of the cylinder 10. After all of the air has been bled from the interior of the cylinder 10, the fluid supply fitting 26 may be rotated about the bolt 25 and due to the dowel pin 45 and associated washer 40, it will be seen that the washer 40 will move with the fluid supply fitting 26, as it is rotated, and move the aperture 38 of the washer out of registry with the bleed duct 12. It will be seen that this relative rotational movement will serve to seal the bleed duct 12 and the bolt 25 may then be screwed down tight to effect a tight, permanent seal between the parts. The valve plug 36 may then be screwed into place to close the bleed port 35 and to prevent the access of foreign matter to the interior thereof and the system is ready for operation.

It will be appreciated from the foregoing that only one specific embodiment of the invention has been illustrated and described. However, many other and further modifications, falling within the scope of the appended claims, will be apparent to those skilled in the art.

I claim:

1. In a brake cylinder assembly, a support member having a pair of ports therein, a fluid supply fitting secured to said member and also having a pair of ports therein, said fluid supply fitting being pivotally mounted on said member, the pivotal movement serving to control communication through one of said ports.

2. In a brake cylinder assembly, a support member having a bleed port therein and a fluid supply fitting pivotally secured thereto and also having a bleed port therein adapted to communicate with said first mentioned bleed port, the pivotal movement of said fluid supply fitting serving to control communication through said bleed ports.

3. In a brake cylinder assembly, a support member having a pair of ports therein, a fluid supply fitting having a pair of ports adapted to register and communicate therewith, and means extending through one of said ports in said fluid supply fitting and into one of said ports in said support member for pivotally mounting said fitting thereon whereby pivotal movement thereof serves to control the registry of and communication through said other ports.

4. In a brake cylinder assembly, a support member having a pair of ports therein, a fluid supply fitting having a pair of ports adapted to register and communicate therewith, a washer disposed between said members, said washer having an aperture also adapted to register with said ports, means for pivotally connecting said support member and said fluid supply fitting with said washer therebetween and means for locking said washer against movement with respect to said fluid supply fitting whereby said washer will serve to control communication through one of said ports.

5. In a brake cylinder assembly, a support member having a pair of ports therein, a fluid supply fitting having a pair of ports adapted to register and communicate therewith, a washer disposed between said members, said washer having apertures also adapted to register with said ports, a pin extending from the face of said fluid supply fitting, a slot in the face of said support member adapted to receive said pin, said pin extending through said washer, means for pivotally connecting said support member and said fluid supply fitting with said washer therebetween, the said pin extending through said washer and seated in said slot whereby said slot serves to control relative pivotal movement between said members, said pivotal movement serving to control communication through and registry of one of said ports.

JOHN W. LEIGHTON.